United States Patent
Pierart

(10) Patent No.: US 12,533,082 B2
(45) Date of Patent: Jan. 27, 2026

(54) BODY MONITORING SYSTEM COMPRISING A MICRO-NEEDLE

(71) Applicant: WIZP AS, Horten (NO)

(72) Inventor: Luc Pierart, Villejuif (FR)

(73) Assignee: WIZP AS, Horten (NO)

( * ) Notice: Subject to any disclaimer, the term of this patent is extended or adjusted under 35 U.S.C. 154(b) by 871 days.

(21) Appl. No.: 17/633,418

(22) PCT Filed: Aug. 7, 2020

(86) PCT No.: PCT/EP2020/072310
§ 371 (c)(1),
(2) Date: Feb. 7, 2022

(87) PCT Pub. No.: WO2021/023882
PCT Pub. Date: Feb. 11, 2021

(65) Prior Publication Data
US 2022/0287638 A1 Sep. 15, 2022

(30) Foreign Application Priority Data
Aug. 8, 2019 (EP) .................................... 19290068

(51) Int. Cl.
*A61B 5/00* (2006.01)
*A61B 5/145* (2006.01)

(52) U.S. Cl.
CPC .......... *A61B 5/685* (2013.01); *A61B 5/14514* (2013.01); *A61B 5/6833* (2013.01)

(58) Field of Classification Search
CPC ... A61B 5/685; A61B 5/14514; A61B 5/6833; A61B 10/0045; A61B 5/1468; A61B 5/1473; A61B 5/1486; A61B 5/14865; A61B 5/6802; A61B 5/0002
See application file for complete search history.

(56) References Cited

U.S. PATENT DOCUMENTS

| 11,045,142 | B1 * | 6/2021 | Windmiller | A61B 5/0048 |
| 2002/0193754 | A1 | 12/2002 | Cho | |
| 2010/0113907 | A1 * | 5/2010 | Schwind | A61B 5/6849 600/345 |
| 2014/0200424 | A1 | 7/2014 | Etzkorn et al. | |
| 2015/0276758 | A1 | 10/2015 | Addisu | |
| 2015/0335288 | A1 | 11/2015 | Toth et al. | |

(Continued)

FOREIGN PATENT DOCUMENTS

| WO | 2018/104647 A1 | 6/2018 |
| WO | 2019/141742 A1 | 7/2019 |

OTHER PUBLICATIONS

Epoxy International, 2016, https://web.archive.org/web/20160810163905/https://epoxyinternational.com/carbonbond-61-electrically-conductive-carbon-filled-room-temperature-cure-epoxy-adhesive-adhesive (Year: 2016).*

(Continued)

*Primary Examiner* — Eric F Winakur
*Assistant Examiner* — Sienna C Pyle
(74) *Attorney, Agent, or Firm* — Sughrue Mion, PLLC

(57) ABSTRACT

The invention relates to a sensor for a body monitoring system comprising micro-needles for measuring body analyte, characterized in that it comprises a support base, at least one basic support plate, and at least one micro-needle distributed on the basic support plate, the basic support plate being adapted to be fixedly mounted on the support base.

14 Claims, 5 Drawing Sheets

(56) References Cited

U.S. PATENT DOCUMENTS

2016/0278672 A1    9/2016  Cho et al.
2017/0128009 A1*   5/2017  Pushpala ............ A61B 5/14503
2018/0279929 A1   10/2018  Huang et al.

OTHER PUBLICATIONS

International Search Report issued Sep. 28, 2020 in International Application No. PCT/EP2020/072310.
Written Opinion of the International Searching Authority issued Sep. 28, 2020 in International Application No. PCT/EP2020/072310.
Extended European Search Report issued Feb. 13, 2020 in European Application No. 19290068.6.

* cited by examiner

[Fig. 1]
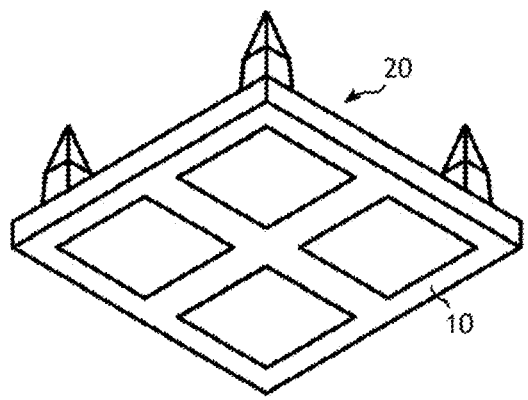
[Fig. 2]
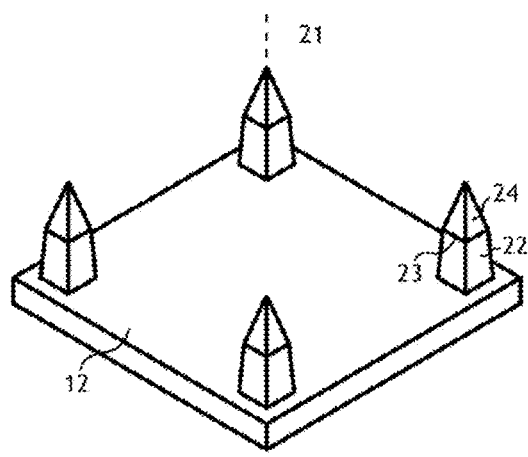

[Fig. 3]
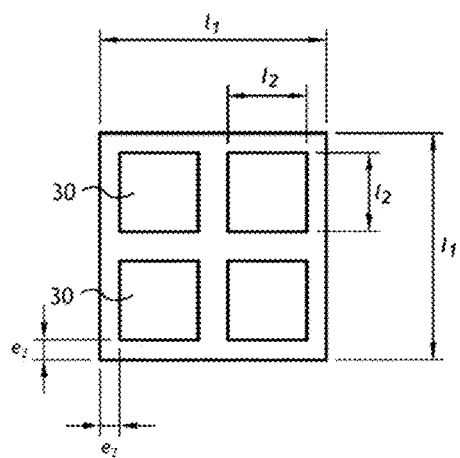
[Fig. 4]
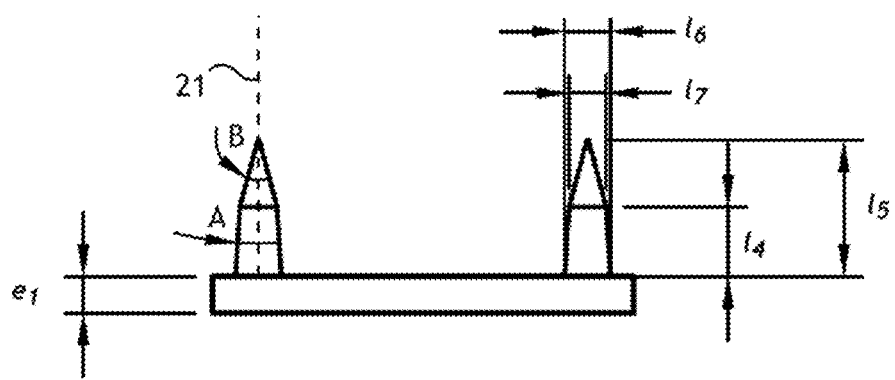

[Fig. 5]
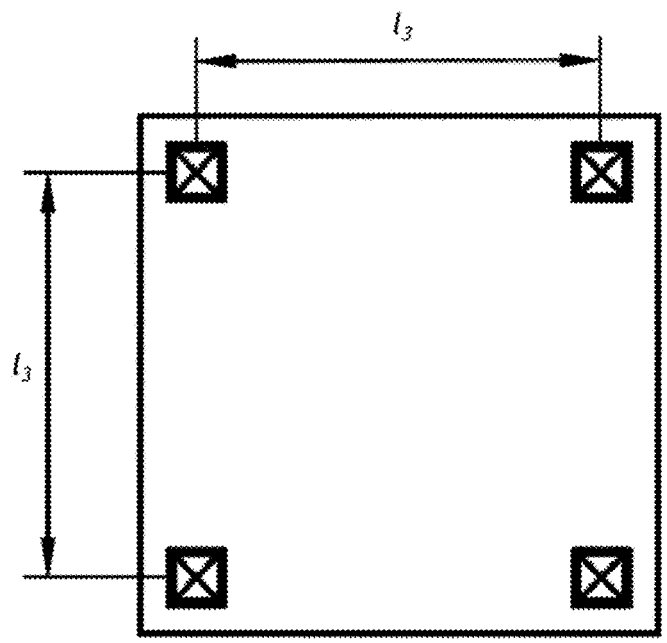
[Fig. 6]
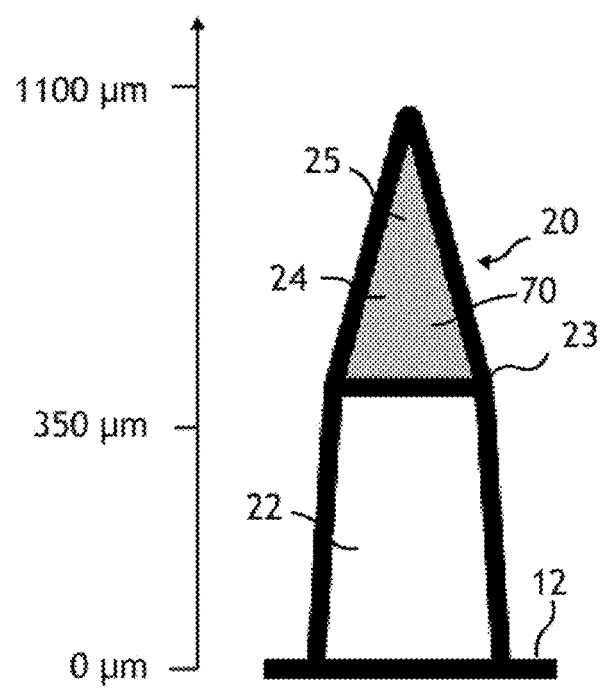

[Fig. 7]
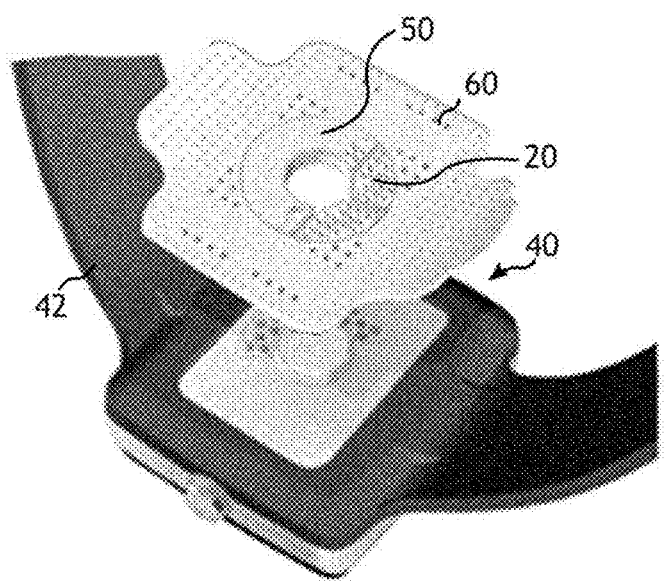
[Fig. 8]
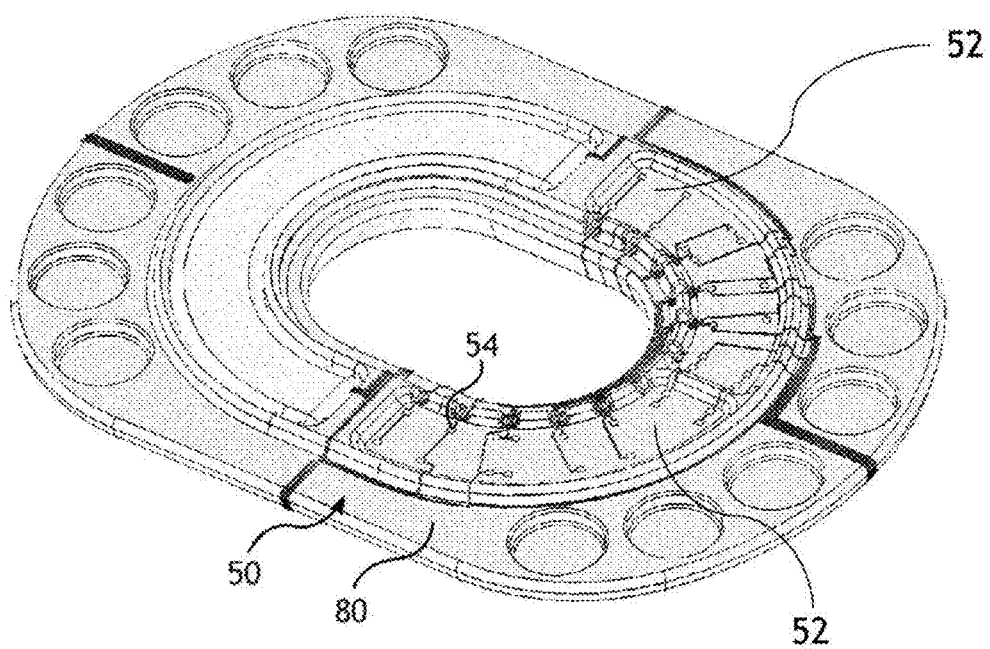

[Fig. 9]
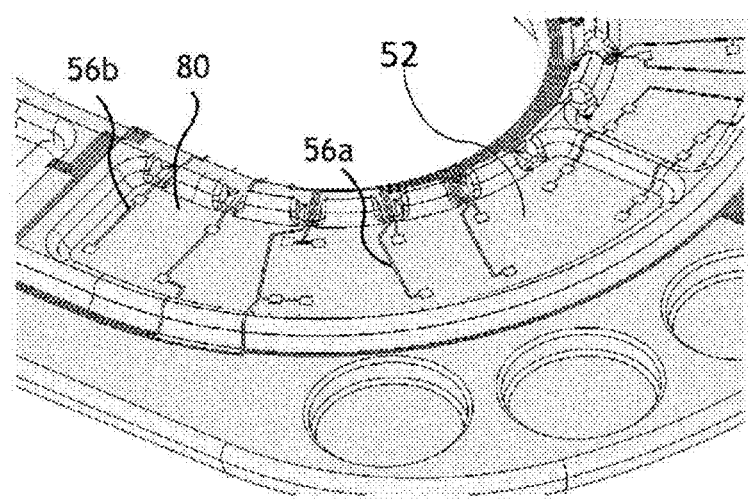
[Fig. 10]
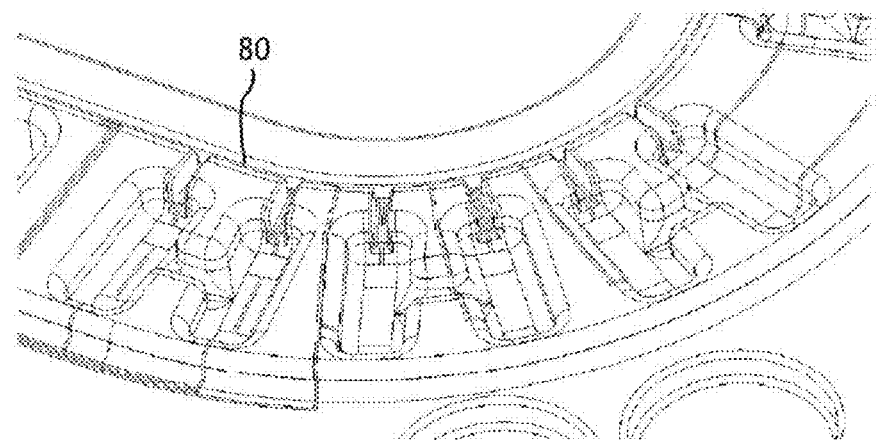

BODY MONITORING SYSTEM COMPRISING A MICRO-NEEDLE

CROSS REFERENCE TO RELATED APPLICATIONS

This application is a National Stage of International Application No. PCT/EP2020/072310 filed Aug. 7, 2020, claiming priority based on European Patent Application Ser. No. 19/290,068.6 filed Aug. 8, 2019.

FIELD OF THE INVENTION

The present invention relates to a device for measuring a body analyte. More specifically, it concerns a device for body monitoring via analysis of a body fluid, typically interstitial fluid.

STATE OF THE ART

Some pathologies such as diabetes require daily monitoring of biochemical parameters of the human body, in particular the concentrations of some compounds (glucose in the example of glycaemia).

To achieve this, it is usual to prick a point of the skin to obtain a drop of blood and to analyse this drop either reactively (with a test strip for example) or electronically (by means of at least one analytical sensor for example) to estimate the target parameters.

At the present time, advanced systems are known that are much less invasive only requiring analysis of interstitial fluid i.e. the fluid filling the space between the blood capillaries and cells. It has an ionic composition close to that of blood plasma.

These advanced systems therefore allow transcutaneous monitoring of desired biochemical parameters without the need for regular piercing of the skin and sampling.

In particular a device has been proposed worn on the wrist and called GlucoWatch, using a phenomenon called iontophoresis (or ionophoresis) whereby an electrical field allows the interstitial fluid to be "drawn" through the skin as far as a sensor on the wall of the device. However, this concept was soon abandoned since only 6% of patients could withstand the pain of electrical extraction. In addition, results of measurements were scarcely reliable.

Alternatively, transcutaneous probes have been proposed in the form of a self-adhering patch pinning a "microneedle-sensor" just under the skin to place the sensor in permanent fluid communication with interstitial fluid, for continuous monitoring. Some of these transcutaneous probes of patch type comprise wireless communication means allowing measurements of interstitial fluid to be sent to a mobile terminal for storage and/or processing of measurements (verification of thresholds and variations, compiling of statistics, triggering of alerts, if necessary, etc.). For example, the sugarBEAT™ or FreeStyle Libre systems can be cited.

Numerous proposed systems comprise an array of micro-microneedles. However, numerous rejects of microneedle arrays have proved to be inevitable when fabricating the system on account of defects of some microneedles. This leads to an increase in production costs of the system. This problem is solved in the prior art by proposing arrays comprising numerous microneedles. The manufacturing defects of one microneedle can therefore be minimised when measuring an analyte.

DESCRIPTION OF THE INVENTION

The main objective of the invention is to overcome the problems above mentioned.

One particular object of the invention is to propose a sensor for body monitoring system comprising microneedles for body analyte measurement, characterized by the fact that it comprises a support base, at least one elementary support plate and at least one microneedle distributed over the elementary support plate, the elementary support plate being adapted to be fixedly mounted onto the support base.

The invention is advantageously completed by the following characteristics taken alone or in any technically possible combinations thereof:
- each elementary support plate is fixedly mounted onto the support base via electrically conductive adhesive to allow electrical connection between the support base and the support plate;
- the sensor comprises several support plates;
- the sensor comprises several microneedles distributed over the support plate;
- each plate is of size smaller than 10×10 mm, and preferably less than 3×3 mm;
- each elementary support plate is fixedly mounted with two hundred microneedles or fewer, advantageously eight microneedles or fewer and more preferably with four microneedles or fewer;
- each elementary support plate and the support base comprise electrical traces connecting the microneedles;
- the support base and each elementary support plate comprise elements of matching shape intended to ensure immobilisation of the elementary support plates on the support base;
- the elements of matching shape comprise cavities formed in the support base having geometry matching the contour of the elementary support plates;
- the elements of matching shape comprise bosses arranged on the support base and adapted to receive at least one support plate;
- the support base is adapted to receive the elementary support plates at different depths.

Another aspect of the invention concerns a body monitoring system comprising a sensor conforming to the invention, and further comprising a module configured to process an electrical signal delivered by the support base and to provide information representing an analyte.

A further aspect of the invention is a method for fabricating a sensor conforming to the invention, comprising at least one step for fixed mounting of a support plate, over which there are distributed several microneedles, onto a support base so that each of the microneedles is electrically connected to the support base.

The fixed mounting of the support plate onto the support base is advantageously implemented at a temperature lower than 50° C.

A further aspect of the invention concerns a body monitoring method comprising a step at which use is made of a sensor conforming to the invention.

DESCRIPTION OF THE FIGURES

Other characteristics, objectives and advantages of the present invention will become apparent on reading the following detailed description in connection with the appended Figures given as nonlimiting examples and in which:

FIG. 1 is a perspective view of a sensor comprising four microneedles.

FIG. 2 is a perspective view of said sensor from a viewing angle differing from FIG. 1.

FIG. 3 is a rear surface view of said sensor.

FIG. 4 is a side view of this sensor.

FIG. 5 gives a view of the tip of the sensor.

FIG. 6 gives a side view of a microneedle according to one embodiment of the invention.

FIG. 7 is a schematic perspective view of a body monitoring system incorporating a sensor conforming to the present invention.

FIG. 8 gives a view of a capsule adapted to carry a plurality of sensors conforming to the invention.

FIG. 9 gives a view on a magnified scale of one part of this capsule.

FIG. 10 gives a view on a magnified scale of part of a capsule according to a different embodiment of the invention.

DEFINITION

By "electrode" it is meant a conductive device allowing the capture of variations in electrical potential in a living organism. An electrode comprises a terminal comprising a connecting end and at least one detection end via which an electrical potential or electrical current is transmitted, each detection end being carried by a microneedle. The electrode can therefore comprise a single detection end. It may also comprise a plurality of detection ends. In this case it will be noted that the electrode remains single even if several detection ends are intended to penetrate the body of a living organism.

DETAILED DESCRIPTION OF THE INVENTION

A description is now given of a particular nonlimiting embodiment of a sensor conforming to the present invention such as illustrated in appended FIGS. 1 to 6.

Microneedle(s)

With reference to FIGS. 1 to 6, a sensor comprises a support plate 10 provided with four microneedles 20, and preferably a plurality of support plates 10 in particular at least three support plates 10. The contour of the plate can be the subject of numerous variants of embodiment. In the illustration in FIGS. 1 to 5, the plate 10 has a square contour. The four microneedles are respectively positioned close to the corners of the plate 10. The microneedles 20 extend perpendicular to the base plane of the plate 10. In other words, the central axis 21 of each microneedle 20 extends perpendicular to the base surface of the plate 10.

With reference to FIGS. 1 to 3, the surface of the plate 10 opposite the microneedles 20 comprises four electrically conductive pads 30, each pad 30 being electrically connected to the active portion 25 of each microneedle 20. The electrically conductive pads 30, when they are electrically connected to a base, allow electrical continuity of an electrode e.g. a working or counter-electrode in the microneedle 20, potentially in separate manner so that each working electrode is independent of the other working electrodes. In practice, these pads 30 can be in one piece with the microneedles 20 or they can be electrically connected to the microneedles 20 by any suitable means through or around the plate 10. The support plate 10 can be formed of any electrical suitable material, for example electrically insulating or conductive. Similarly, the microneedles 20 can be formed of any suitable material. They are able to convey an electrical signal captured by the active surface 25. Preferably, the microneedles 20 can be polycarbonate- or silicon-based. The microneedle(s) 20 are preferably solid i.e. devoid of any cavity. Therefore, the fabrication of microneedles 20 adapted for analyte measurement is facilitated whilst allowing electrochemical measurement of an analyte. The microneedle can be mostly composed of silicon. If in silicon, the microneedle has a nonconductive protective outer layer of $SiO_2$ formed by surface oxidation of the silicon. The microneedle therefore may not need a coating in addition to the $SiO_2$ layer.

With reference to FIG. 2 and FIG. 6, each microneedle 20 comprises a bottom shaft 22 and pointed tip 24. The shaft 22 may preferably be tapered towards the pointed tip 24 of the microneedle 20. The pointed tip 24 has a greater slope than the shaft 22, i.e. it forms an angle B with the central axis 21 that is greater than angle A formed between the bottom shaft 22 and the central axis 21. The microneedle 20 has a break or slope transition 23 between the bottom shaft 22 and the pointed tip. The slope transition 23 can be embodied as an edge.

The bottom shaft 22 and the pointed tip 24 can have a square cross-section. In this case the bottom shaft 22 is quadrangular and the tip 24 is of pyramidal type. The microneedle 20 as a whole can preferably be of obelisk shape.

As a variant however, the microneedle 20 can have a circular cross-section. In this case, the bottom shaft 22 has the shape of a truncated cone of circular revolution and the tip 24 is formed of a tip of conical revolution.

Preferably, the pointed tip 24 extends exclusively over a distance of between 350 µm and 1100 µm from the base of the bottom shaft 22 of the microneedle i.e from the surface 12 of the support plate 10, and preferably between 600 µm and 1000 µm from the base of the microneedle and this surface 12 of the support plate 10. By "extends exclusively over a distance between 350 µm and 1100 µm" it is meant that the portion of the pointed tip 24 the closest to the base of the bottom shaft 22 is arranged at a distance greater than 350 µm from the base of the bottom shaft 22 and that the portion the most distant from the base of the bottom shaft 22 is arranged at a distance of less than 1100 µm.

Additionally, tests have shown that the surface area of the active detection portion 25 must be between 0.04 and 0.9 $mm^2$. Therefore, when measurement is taken with a single microneedle 20, the active portion 25 of this microneedle 20 is between 0.04 and 0.9 $mm^2$. When measurement is taken with several microneedles 20, the surface of the aforementioned active portion of between 0.04 and 0.9 $mm^2$ is taken to be the total active surface area of the microneedles under consideration.

Persons skilled in the art will understand that the obelisk shape of the microneedles 20 or the shape of a similar body of circle of revolution but having a slope transition between the bottom shaft 22 and the pointed tip 24 allows solving of the problem raised by known prior art microneedles 20, namely minimising the penetration diameter into the skin whilst maximising the surface area of the active portion 25 contained within that part of the skin between the epidermis and the nerves.

The microneedles 20 conforming to the present invention can be fabricated using any appropriate microfabrication method.

The active portion 25 comprises an electrically conductive surface, preferably coated with a coating subject of various variants depending upon type of desired measurement and type of analyte to be measured. For measurement of glycaemia, the active portion 25 is provided with a coating able to implement an enzymatic reaction with glucose. The active portion 25 may also not comprise a coating specific to a predetermined analyte, for example when it is the active portion 25 of a counter-electrode or reference electrode.

Also, according to the particular embodiment shown in FIGS. 1 to 5, and as a nonlimiting example:

the height $l_4$ of the bottom shaft 22 is of the order of 380 µm, the total height $l_5$ of each microneedle 20 is of the order of 750 µm, the width at the base $l_6$ of each microneedle 20 is of the order of 0.25 mm, the width $l_7$ of the microneedle at the slope transition 23 is of the order of 0.2 mm, the converging angle A of the bottom shaft 22 with the central axis 21 is of the order of 7°, the angle B of the pointed tip 24 with the central axis 21 is of the order of 30°.

Array of Microneedles

The microneedle(s) 20 conforming to the invention allow a reduction in the number of microneedles 20 of a working electrode 70. Preferably, a working electrode comprises between one and seven, in particular between one and five and preferably between one and three active portions 25, each covering at least part of the surface of the pointed tip 24 of a different microneedle 20. Known systems in the prior art do not allow the use of so few microneedles.

Since the invention allows a drastic reduction in the number of microneedles 20 needed for measurement compared with known prior art systems, it is possible, for a given sensor surface area, to minimise microneedle density. Each pair of adjacent microneedles 20 is preferably separated by a distance between the tips of the pointed tips 24 of at least 1 mm and preferably at least 1.5 mm, even when applicable at least 1.8 mm. This has the effect of preventing homogeneous deformation of the skin when an array of microneedles 20 is contacted with the skin, known in other technical fields as the fakir effect, and on the contrary promotes localised deformation of the skin around each microneedle. Therefore, the pain caused by penetration of the needles into the skin can be significantly reduced, even eliminated, and penetration takes place occurs most naturally the needles becoming mechanically independent.

Also, in the particular embodiment illustrated in FIGS. 1 to 5, and as a nonlimiting example, the centre distance $l_3$ between each pair of microneedles 20 is of the order 1.5 mm.

Electrodes

The sensor is preferably adapted to measure the presence or concentration of an analyte via electrochemistry. A sensor may comprise a working electrode 70 adapted to evaluate the presence of an analyte in a user's body. The working electrode 70 comprises at least one end electrically connected to a module configured to process the electrical signal of the working electrode 70, and at least one second end formed by the active portion 25. It may also comprise a plurality of second ends. The active portion 25 of the microneedle 20 covers at least part of the surface of the pointed tip 24 and preferably the entirety of the surface of the pointed tip 24. For this purpose, the active portion 25 at the pointed tip 24, is coated with any suitable coating for the desired measurement, typically a coating adapted for the electrochemical detection of glycaemia.

The sensor may comprise a counter-electrode. The counter-electrode may comprise a first end intended to be electrically connected to a module configured to process an electrical signal, and at least one other end allowing processing of an electrical signal in the user's body. The other end of the counter-electrode may cover a counter-electrode microneedle e.g. a microneedle conforming to the invention. However, the counter-electrode does not have the same pre-requisites of active surface area as the working electrode. Therefore, the pointed tip of the counter-electrode can extend exclusively over a distance of between 100 µm and 1100 µm from the bottom shaft of the microneedle. As a variant, the other end of the counter-electrode can cover the entire surface of counter-electrode microneedle.

For a sensor conforming to one embodiment of the invention, comprising several working electrodes, each working electrode can be adapted to detect the same analyte as another working electrode, or adapted to detect an analyte differing from that of another working electrode.

If several working electrodes are adapted to detect the same analyte, each working electrode may comprise an active portion 25 comprising the same type of coating. It is therefore possible to carry out independent measurements for the same analyte and thereby obtain better accuracy of analyte measurement. Each working electrode may also comprise different active portions 25, comprising different coatings, but adapted to detect the same analyte. The concentration of the analyte can therefore be detected with more accuracy than when using a single coating for the active portion 25.

Each electrode can also be adapted to detect different analytes. It is therefore possible to monitor several pathologies with the same monitoring system.

Support Plate

As seen above, the microneedle(s) 20 can be arranged on a support plate 10. With reference to FIGS. 1 to 4, the thickness $e_1$ of the support plate is advantageously between 0.1 mm and 1 mm, and preferably of the order of 0.2 mm. The dimensions of the microneedles 20 can be the subject of numerous variants of embodiment. The same applies to the support plate 10. As a nonlimiting example and with reference to the particular embodiment illustrated in FIGS. 1 to 5, the support plate 10 has sides of width $l_1$ of less than 10 mm, advantageously less than 3 mm, for example of the order of 2.3 mm. The electrically conductive pads 30 are square pads for example having sides $l_2$ of the order of 0.8 mm. These pads 30 can be positioned at a distance $e_2$ of approximately 0.2 mm from the edges of the support plate.

The support plates 10 can themselves be the subject of different variants of embodiment. Some support plates 10 can be adapted to carry four microneedles for example, whilst other support plates 10 can be adapted to carry only two microneedles 20.

The support plate(s) 10 are adapted to be mounted onto a support base 80. The support base 80 can be a casing 40 for example, a capsule 50, or a structure able to receive the casing 40, for example connected to the body attachment means.

Each support plate 10 can be fixedly mounted with eight microneedles 20 or fewer, and preferably with four microneedles 20 or fewer. Therefore, for a manufacturing defect rate of a microneedle 20 in a given array of microneedles 20, the frequency of fabrication of an array of microneedles 20 in which all the microneedles 20 are valid is increased compared with microneedle arrays comprising for example more than 50 or more than 100 microneedles. The sensor may comprise a plurality of plates 10, each plate 10 having a limited number of microneedles, for example fewer than eight microneedles and preferably fewer than four microneedles to prevent the rejecting of a microneedle array on account of the failure of one of the microneedles in the array. This allows the production costs of the sensor to be reduced.

Each support plate 10 and the base 80 preferably comprise electrical traces connecting the microneedles 20. Therefore, an electrode for example the working electrode or counter-electrode can pass through the support plate 10 to have a first end in the support base and at least one other end on a microneedle 20. It is also possible to use an electrically conductive adhesive for fixed mounting of the support plate 10 onto the support base 80 allowing electrical connection between the support base 80 and the support plate 10, and by extension the microneedle 20. The use of an adhesive for fixed mounting of a support plate 10 onto the support base 80 is of particular advantage when a plurality of support plates 10 are mounted on the support bases 80, for example when more than three support plates 10, preferably more than four support plates 10 and in particular more than eight support plates 10 are mounted onto the support base 80.

The base 80 and the support plate(s) 10 preferably comprise elements of matching shape intended to ensure immobilisation of the elementary support plates 10 on the support base 80. With reference to FIG. 10, an element of matching shape can preferably be a cavity formed in the support base 80 having geometry matching the contour of one or more support plates 10. As a variant, or in addition, the element of matching shape can preferably be bosses arranged on the support base 80 and adapted to receive at least one support plate 10 for example by surrounding and/or supporting the latter. Therefore, when mounting the support plates 10 onto the support base 80, the support plate 10 and the microneedles can be held in controlled position until the support plates(s) 10 are fixed onto the base 80. In addition, each of the support plates 10 can therefore be fixedly mounted in a perfectly controlled position.

The support base 80 can preferably be adapted to receive the elementary support plates 10 at different depths. It is therefore possible to fabricate a system comprising microneedles 20 of different heights, the microneedles 20 being fabricated with a process whereby all the microneedles 20 obtained with the fabrication method are of the same size.

With reference to FIGS. 8 and 9, the support base 80 may comprise electrical traces. The elements of matching shape of the base 80 and the electrical traces of the base 80 can be arranged so that a support plate 10 also has one or more electrical traces facing the electrical trace of the base 80. Therefore, an electrode for example a working electrode or counter-electrode can be formed spanning the base and the support plate 10.

One aspect of the invention concerns a method for manufacturing a body monitoring system conforming to the invention wherein the support plate(s) 10, over which the microneedles 20 are distributed, are fixedly mounted onto the support base 80, so that each of the microneedles 20 is electrically connected to the support base 80 whether or not separately. From the support base 80, it is therefore possible to control the potential of the electrode portions of the support plate 10 and of each microneedle 20.

Each microneedle 20 can have an active portion 25 having a coating comprising a biologically active compound which can be denatured by temperatures that are too high. The step for fixed mounting of the support plate 10 is preferably implemented at a temperature lower than 80° C., in particular lower than 50° C. The denaturing of the active compounds of the microneedles 20 is therefore avoided. This fixed mounting step can be implemented via ultraviolet radiation bonding between the support plate 10 and the support base 80, using an electrically conductive adhesive.

Measurement System

With the present invention, independent measurement of glycaemia level becomes possible by means of a plurality of working electrodes 70. This is an undeniable advantage compared with the prior art in which said independent measurement by means of a working electrode comprising a single microneedle could not be envisaged since the measurement signal was too noisy using a single microneedle. The sensor therefore preferably comprises several working electrodes 70, the measurement system being adapted for individual measurement of the electrical potential of each of the working electrodes 70.

Measurement of the potential of each of the working electrodes 70 can be multiplexed. In the present invention, means are advantageously proposed allowing discarding of minimal or maximal measurement values of the potential associated with a set of measurements, which was impossible using the sensors of the prior art.

The sensor conforming to the present invention can be implemented in different types of body monitoring systems.

Preferably, the sensor conforming to the invention is used in a monitoring system of the type illustrated in appended FIGS. 7 to 10.

Said system comprises a casing 40 in the form of a watch casing comprising a bracelet 42 adapted to surround an individual's wrist. The casing 40 houses a module configured to process the electrical signal delivered by each microneedle 20 and to provide information representing a physical magnitude of the fluid, typically a glycaemia level.

As previously mentioned, the body monitoring system used, preferably according to the invention, comprises a capsule 50 comprising at least one sensor of the aforementioned type, and preferably a plurality of sensors as is described in more detail below.

The body monitoring system conforming to the invention also comprises a patch 60 to which the capsule 50 is connected, the patch 60 itself being provided with an adhesive for adhering of the patch and capsule 50 assembly onto the skin of an individual.

As illustrated in FIG. 8 and partially in FIG. 9, the capsule 50 preferably has the general shape of a ring comprising a plurality of hollow housings 52 each being respectively adapted to receive the support plate 10 of an aforementioned sensor.

With reference to FIGS. 7 and 8, the capsule 50 may comprise electrically conductive pads 54 intended to be positioned facing electrically conductive pads 30 provided on the support plate 10, to ensure electrical connection between the microneedles 20 and the module provided in the casing 40 for processing of the electrical signal thus received. The pads 54 are themselves interconnected with the aforementioned module via electrically conductive traces 56a.

As can be seen on examining FIG. 9, some of the pads 54 can be individually connected to the aforementioned processing module via respective traces 56a whilst other pads 54 can be connected to the processing module via common traces 56b.

Implementation of Measurement of a Body Analyte

As previously indicated, the present invention also concerns a body monitoring method using a sensor comprising a microneedle of the aforementioned type.

The monitoring method comprises a step to measure a body analyte by means of a microneedle 20 conforming to one embodiment of the invention. By reason of the characteristics of the microneedle 20, the sensor may comprise a plurality of working electrodes. Measurement can be performed for example by polarising the working electrode(s)

and counter-electrode(s) to an electrical potential adapted to cause a redox reaction involving the analyte to be measured.

The measurement step can preferably be implemented at least by means of two different working electrodes. For example, the measurement step can be performed independently, successively on each of the working electrodes 70, or in parallel in each of the working electrodes 70. Therefore, the concentration of the electrolyte can be analysed more accurately than with a system comprising for example a single working electrode having several ends in the form of microneedles.

A further aspect of the invention is a method for measuring a body analyte comprising a step whereby the microneedles of a sensor conforming to the invention penetrate a user's skin. Therefore, the needles of the sensor can enter the skin without an applicator on account of the spacing of the microneedles 20. A weak force compared with the force applied by an applicator can be used for penetration of the microneedles. Preferably a force of less than 50 Newtons, and more preferably less than 30 Newtons, can be used for penetration of the microneedles 20. Therefore, penetration of the microneedles can be obtained using a hand or preferably with mechanical attachment means of the system, for example a bracelet.

The invention claimed is:

1. A sensor for body monitoring system including microneedles for body analyte measurement, comprising a support base, several elementary support plates and several microneedles distributed over each elementary support plate, each elementary support plate comprising a first surface from which the microneedles extend and a second surface opposite the first surface, the second surface being fixedly mounted onto the support base by electrically conductive adhesive to allow electrical connection between the support base and the elementary support plate, wherein the support base and each elementary support plate comprise elements of matching shape configured to ensure immobilisation of the elementary support plates on the support base, wherein the elements of matching shape comprise cavities formed in the support base having geometry matching a contour of the elementary support plates.

2. The sensor according to claim 1, wherein the elementary support plate is fixedly mounted with two hundred microneedles or fewer.

3. The sensor according to claim 1, wherein the elementary support plate and the support base comprise electrical traces connecting the microneedles.

4. The sensor according to claim 1, wherein the elementary support plate measures less than 10×10 mm.

5. The sensor according to claim 1, wherein the support base is adapted to receive the elementary support plates at different depths.

6. The sensor according to claim 1, comprising at least one working electrode, wherein each working electrode is adapted to detect an analyte differing from that of another working electrode.

7. The sensor according to claim 1, comprising at least one working electrode, wherein each working electrode is adapted to detect the same analyte as another working electrode.

8. A body monitoring system, comprising a sensor according to claim 1 and a module configured to process an electrical signal delivered by the support base and to provide information representing an analyte.

9. A method for fabricating a sensor according to claim 1, comprising at least one step for fixed mounting of a support plate, over which there are distributed several microneedles, onto a support base so that each of the microneedles is electrically connected to the support base.

10. The method for fabricating according to claim 9, wherein the fixed mounting of the support plate onto the support base is implemented at a temperature lower than 50° C.

11. The sensor according to claim 1, wherein the elementary support plate is fixedly mounted with eight microneedles or fewer.

12. The sensor according to claim 1, wherein the elementary support plate is fixedly mounted with four microneedles or fewer.

13. The sensor according to claim 1, wherein the elementary support plate measures less than 3×3 mm.

14. A sensor for body monitoring system including microneedles for body analyte measurement, comprising a support base, several elementary support plates and several microneedles distributed over each elementary support plate, each elementary support plate comprising a first surface from which the microneedles extend and a second surface opposite the first surface, the second surface being fixedly mounted onto the support base by electrically conductive adhesive to allow electrical connection between the support base and the elementary support plate, wherein the support base and each elementary support plate comprise elements of matching shape configured to ensure immobilisation of the elementary support plates on the support base, wherein the elements of matching shape comprise bosses arranged on the support base and adapted to receive at least one support plate.

* * * * *